US012557716B2

(12) United States Patent
Marchesan et al.

(10) Patent No.: US 12,557,716 B2
(45) Date of Patent: Feb. 24, 2026

(54) STRUCTURAL ELEMENT FOR AGRICULTURAL EQUIPMENT, AND AGRICULTURAL EQUIPMENT

(71) Applicant: Marchesan Implementos e Máquinas Agrícolas Tatu S.A., Matão (BR)

(72) Inventors: José Luiz Alberto Marchesan, Matão (BR); Sebastião Antonio Jacomine, Matão (BR); Carlos Cesar Galhardi, Matão (BR)

(73) Assignee: Marchesan Implementos e Máquinas Agricolas Tatu S.A., Matão-SP (BR)

( * ) Notice: Subject to any disclaimer, the term of this patent is extended or adjusted under 35 U.S.C. 154(b) by 268 days.

(21) Appl. No.: 17/552,495

(22) Filed: Dec. 16, 2021

(65) Prior Publication Data

US 2022/0183201 A1 Jun. 16, 2022

(30) Foreign Application Priority Data

Dec. 16, 2020 (BR) .......................... 102020025770-6

(51) Int. Cl.
*A01B 15/14* (2006.01)
*A01B 23/04* (2006.01)

(52) U.S. Cl.
CPC ............ *A01B 15/14* (2013.01); *A01B 23/046* (2013.01)

(58) Field of Classification Search
CPC ..... A01B 23/046; A01B 15/14; A01B 73/044; A01B 29/04; A01B 29/048; A01B 49/027; A01B 29/041
See application file for complete search history.

(56) References Cited

U.S. PATENT DOCUMENTS

| | | | | |
|---|---|---|---|---|
| 2,690,109 | A | * 9/1954 | Frevik | A01B 23/046 |
| | | | | 172/450 |
| 2,857,724 | A | * 10/1958 | Barnes | A01B 23/046 |
| | | | | 172/776 |
| 4,479,549 | A | * 10/1984 | Fegley | A01B 63/22 |
| | | | | 172/244 |
| 4,561,504 | A | * 12/1985 | Andersen | A01B 35/30 |
| | | | | 172/483 |
| 7,021,397 | B2 | * 4/2006 | Pitonyak | A01B 73/044 |
| | | | | 172/311 |
| 9,936,621 | B2 | * 4/2018 | Degelman | A01B 73/048 |
| 10,433,471 | B2 | * 10/2019 | Paulessen | A01B 49/027 |
| 10,834,862 | B2 | * 11/2020 | Ankenman | A01B 5/08 |

(Continued)

FOREIGN PATENT DOCUMENTS

GB 585993 A * 3/1947

*Primary Examiner* — Christopher J Sebesta
*Assistant Examiner* — Blake E Scoville
(74) *Attorney, Agent, or Firm* — Alston & Bird LLP

(57) ABSTRACT

Described is a structural element for agricultural equipment comprising at least one pair of transverse beams associated with at least one pair of support bars of a set of agricultural discs, where the longitudinal distance between the beams of the pair of transverse beams is smaller than the longitudinal distance between the bars of the pair of support bars. This construction allows a greater free space for the flow of material cut by the discs (soil and plant residues) and a decrease in the occurrence of stops to clear the obstruction or even the formation of "heaps" on the ground, while still promoting an adequate arrangement for the absorption and dissipation of efforts that act on the structural element.

6 Claims, 7 Drawing Sheets

(56)        References Cited

U.S. PATENT DOCUMENTS

| | | | |
|---|---|---|---|
| 2010/0282481 A1* | 11/2010 | Tamm | A01B 73/044 |
| | | | 172/311 |
| 2014/0262373 A1 | 9/2014 | Landoll et al. | |
| 2017/0049037 A1* | 2/2017 | Hilvers | A01B 29/04 |

* cited by examiner

CORTE A-A

STRUCTURAL ELEMENT FOR AGRICULTURAL EQUIPMENT, AND AGRICULTURAL EQUIPMENT

CROSS REFERENCE TO RELATED APPLICATIONS

This application claims priority to and the benefit of Brazilian application Ser. No. 102020025770-6, filed Dec. 16, 2020; the contents of which as are hereby incorporated by reference in their entirety.

BACKGROUND

Technical Field

The present invention relates to a structural element of agricultural equipment, and more particularly to a structural element of an agricultural machine chassis for soil management that allows the support of the concave discs, which allows a greater free space for the flow of material cut by the discs (soil and plant residues) and reduction in the occurrence of stops to clear the obstruction or even formation of "heaps" on the ground, while still promoting an adequate arrangement to absorb and dissipate the efforts that act on the structural element.

Description of Related Art

The growing demand for agricultural soil preparation equipment that operate at higher displacement speeds—16 to 24 km/h (compared to 06 to 12 km/h for usual equipment) has culminated in the use of equipment equipped with two parallel sections of discs concave, which stand out for being installed individually and resiliently (use of damping elastomers or flexible rods) next to a mounting bracket, in order to locally absorb the efforts from the soil and plant residues remaining on the surface of the land or even partially buried in the ground.

Examples of equipment mentioned can be seen in patent documents U.S. Pat. No. 9,936,621 and US2014262373A1, which show the structural form of their chassis with beams forming a "square" or "rectangular" side profile, that is, the beams that support the concave disc bars are arranged parallel to the beams that support said bars.

This usual prior art construction basically results in two problems: (i) the space between the rows of discs is small and implies obstruction of the cut material on the machine elements (structure or the discs themselves), or even the formation of "heaps" of material on the worked terrain; and (ii) the efforts acting on the sets of discs reach said set practically in a perpendicular direction, which results in a great bending effort on the supporting rods of the discs.

Therefore, it is desirable to develop a new structure applicable to agricultural equipment that is capable of providing a free flow region for the flow of material cut by the discs, as well as a better distribution of efforts acting on the structure of the equipment.

BRIEF SUMMARY

A first objective of the present invention is to present a structural element for agricultural equipment that is capable of providing an open region for the free flow of material flow cut by the discs.

A second objective of the present invention is to present a structural element for agricultural equipment that is capable of providing a better distribution of efforts acting on the equipment structure.

A third objective of the present invention is to present agricultural equipment equipped with a structural element such as the one mentioned herein.

The present invention deals with a structural element for agricultural equipment comprising at least one pair of transverse beams associated with at least one pair of support bars of a set of agricultural discs, whereby the longitudinal distance between the beams of the pair of transverse beams is less than the longitudinal distance between the bars of the pair of support bars.

In a possible embodiment, the association between at least one beam of the pair of transverse beams and at least one bar of the pair of support bars is configured through at least one support.

In another possible embodiment, the structural element comprises an arcuate profile plate associated with the longitudinal end of the pair of transverse beams and the pair of support bars.

In another possible embodiment, the structural element comprises a central section hingedly associated with at least one lateral section, each central and lateral section comprising at least one pair of transverse beams and at least one pair of support bars.

In another possible embodiment, the pair of transverse beams and the pair of support bars configure, in between, an open region for free flow of material flow coming from the set of discs. In another possible embodiment, the open region comprises a trapezoidal-shaped profile.

The present invention further contemplates agricultural equipment provided with a structural element as described herein.

BRIEF DESCRIPTION OF THE FIGURES

The present invention will be described in more detail below, based on an example of execution shown in the drawings. The figures show.

DETAILED DESCRIPTION OF VARIOUS EMBODIMENTS

First, it should be noted that the term "preferred" used here should not be understood as mandatory or imperative, but rather to characterize an embodiment of particular efficiency of the invention among the multiple possible ones.

Figure 7:
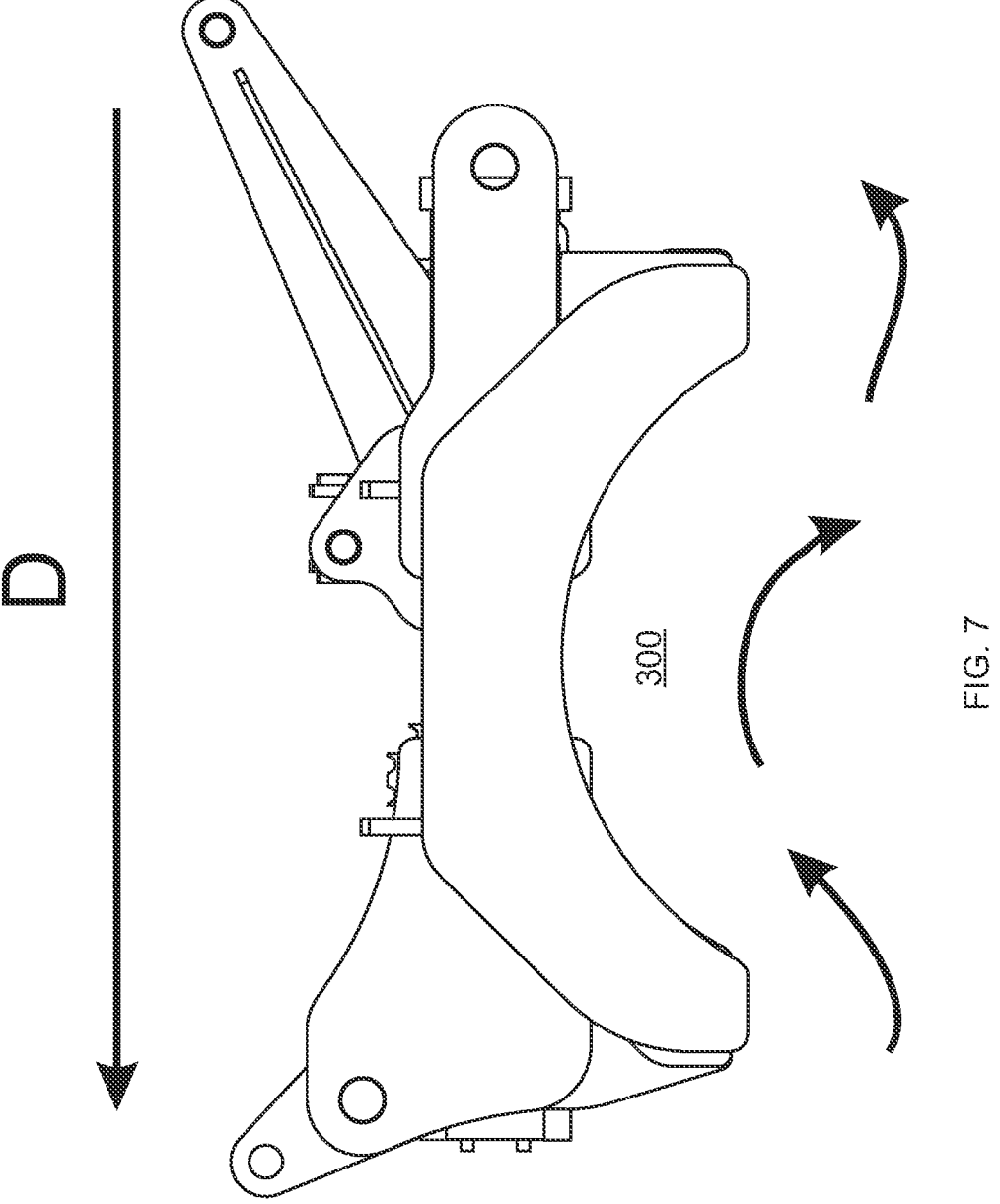
FIG. 7 is a detail of a side section of the structural element of the present invention in a preferred embodiment, illustrating the flow of material cut by the equipment discs during its operation.
Figure 8:
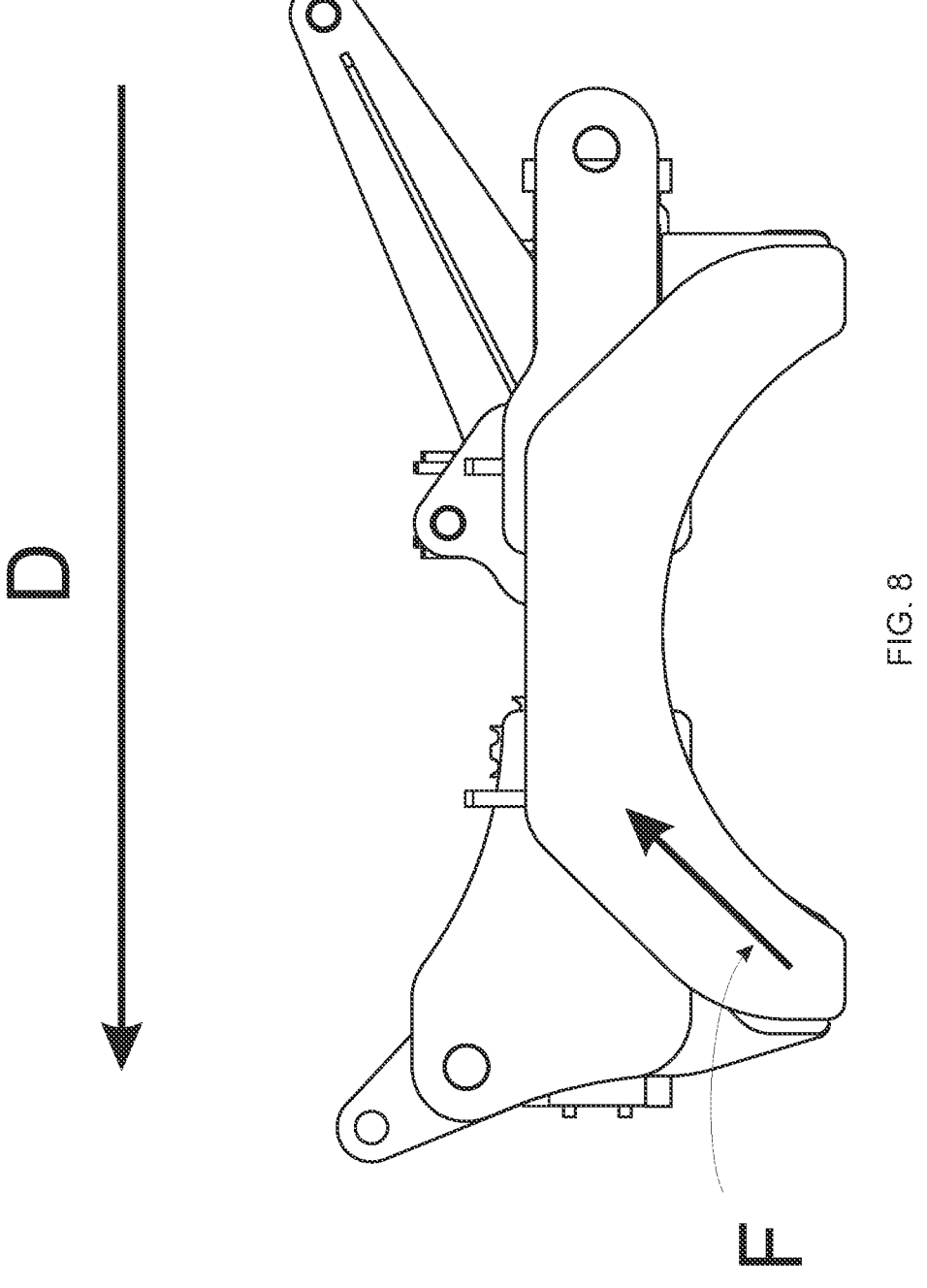
FIG. 8—is a detail of a side section of the structural element of the present invention in a preferred embodiment, illustrating an acting effort on the structure.

In addition, the terms "crosswise", "longitudinally" and other indicative terms related to direction and course must all be taken as a function of the course of work displacement of the agricultural equipment, as indicated by arrow "D" in FIGS. 7 and 8.

It is clarified that the structural element 1 of the present invention can be applied to agricultural equipment of a single section or multiple sections. For example, structural element 1 can be applied to equipment whose chassis is rigid and has a single continuous section, or to equipment whose chassis is formed by a central section and multiple hinged side sections for configuration, for example, of transport positions and equipment work. Furthermore, although the preferred embodiment described here reveals an application to a multi-section chassis, the structural element 1 is fully applicable to rigid single-section chassis, for example.

Figure 1:
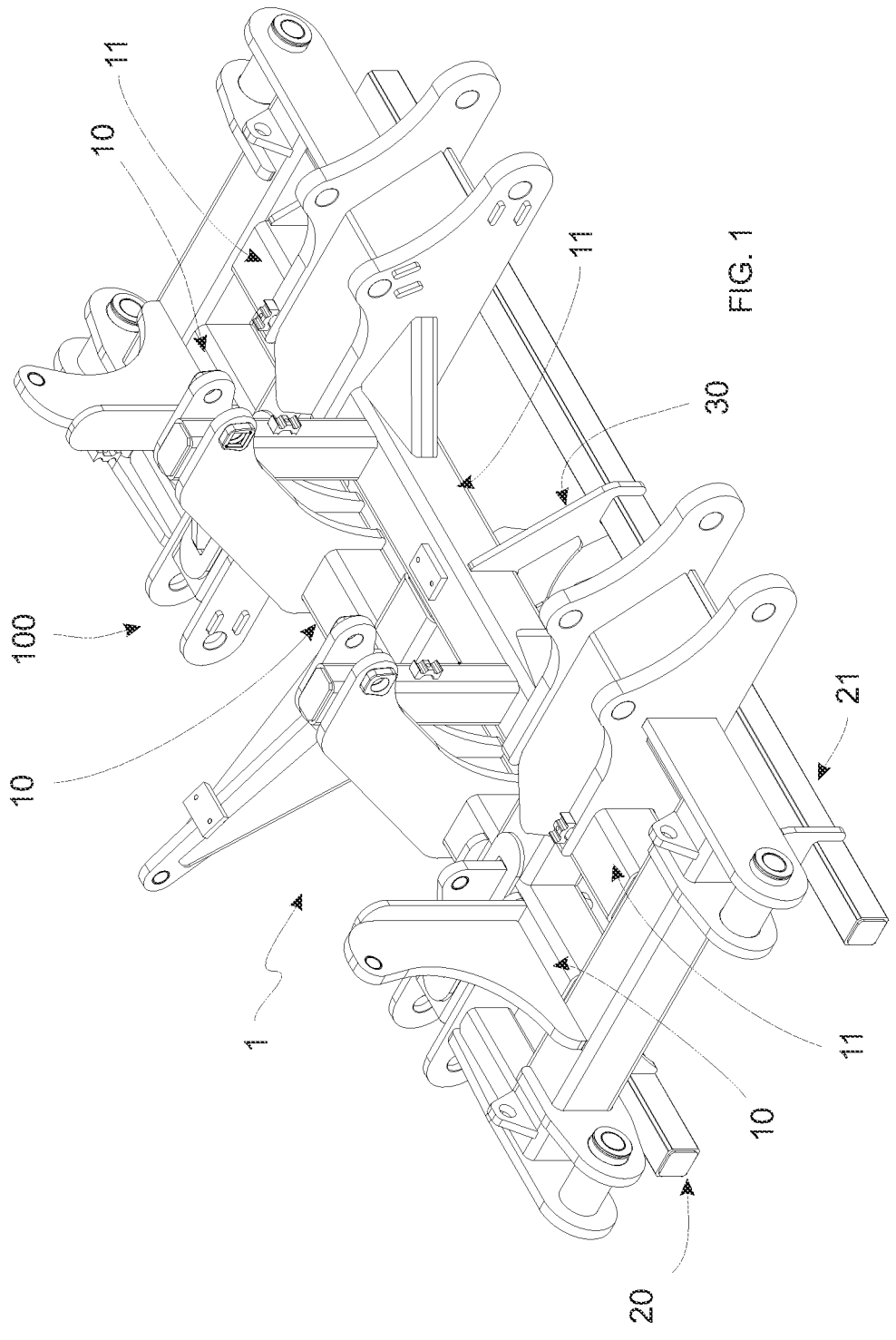
FIG. 1 is a perspective view of a central section of the structural element of the present invention in an embodiment considered preferred.
Figure 2:
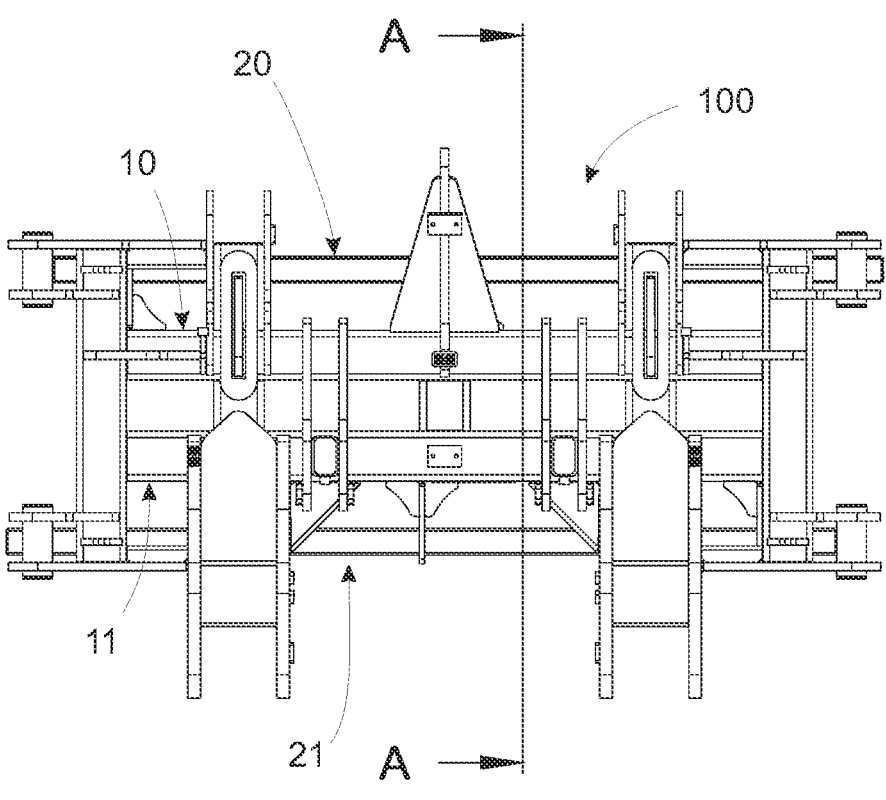
FIG. 2 is a top view of a central section of the structural element of the present invention in an embodiment considered preferred; indicating an A-A cut.
Figure 3:
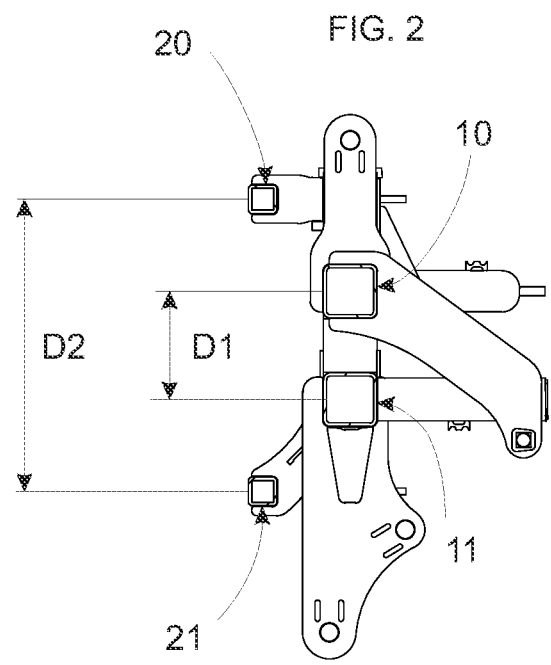
FIG. 3 is the A-A cut of FIG. 2.
Figure 4:
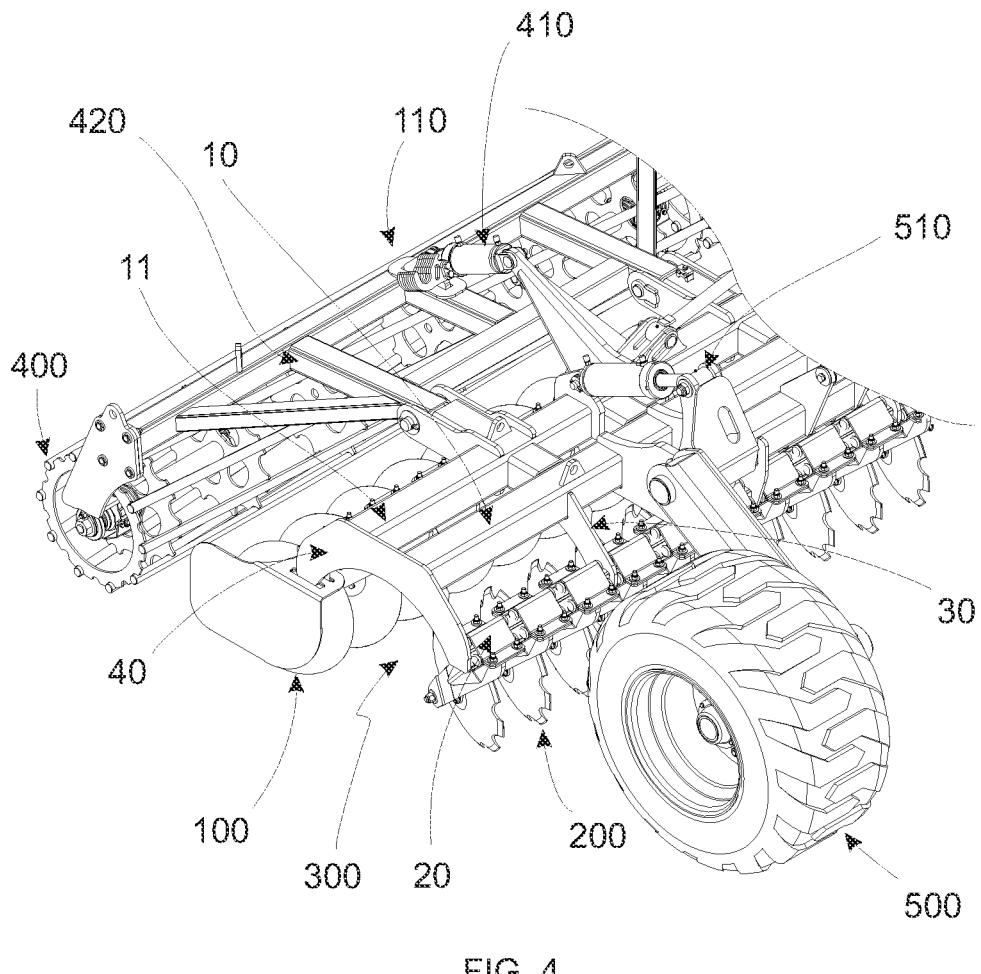
FIG. 4 is a perspective view of a side section of the structural element of the present invention in a preferred embodiment, applied to an agricultural equipment.
Figure 5:
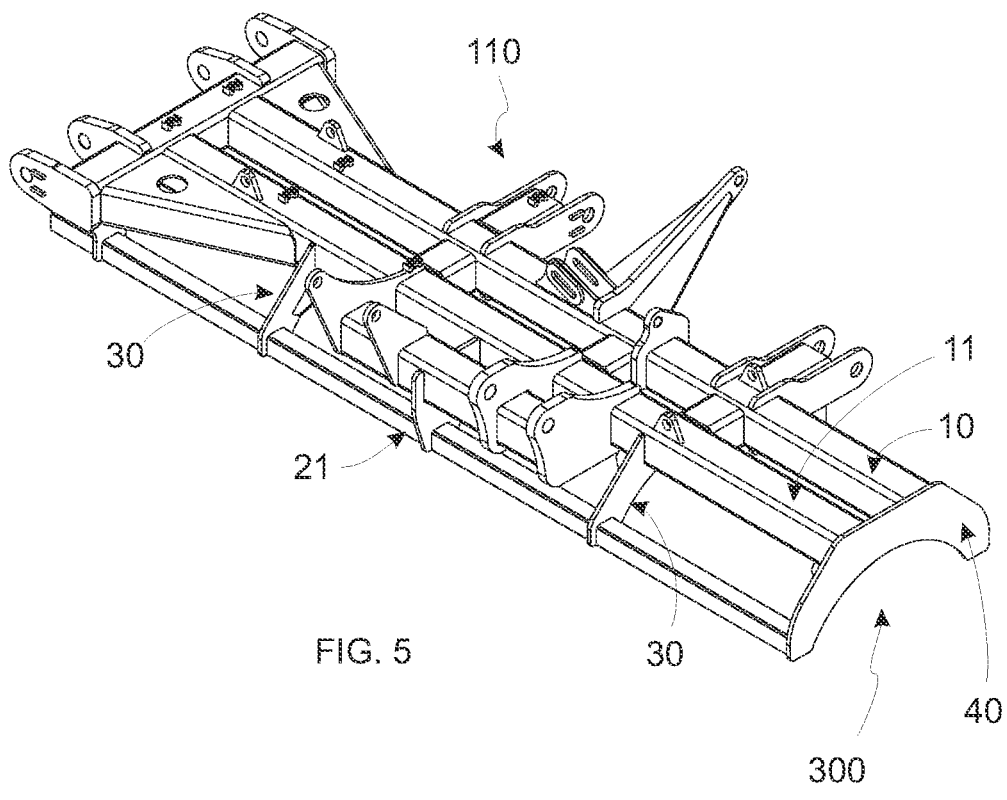
FIG. 5 is a perspective view of a side section of the structural element of the present invention in a preferred embodiment.
Figure 6:
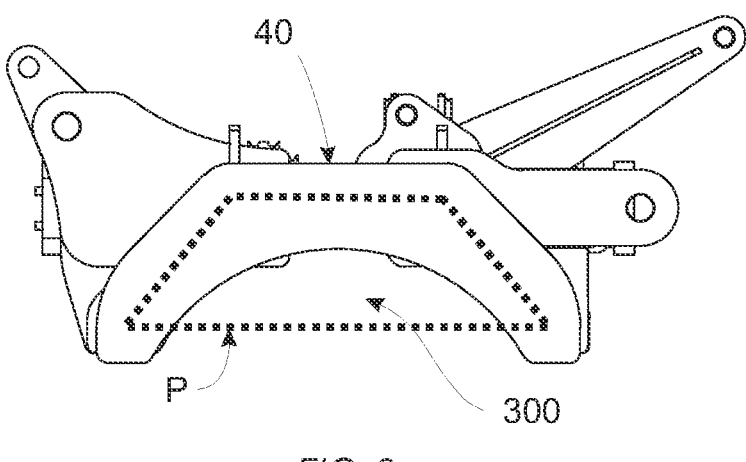
FIG. 6 is a perspective view of a central section of the structural element of the present invention in a preferred embodiment.

That said, the structural element 1 comprises at least one pair of transverse beams 10, 11 associated with at least one pair of support bars 20, 21 of a set of agricultural discs 200, the longitudinal distance D1 between the beams of the pair. of transverse beams 10, 11 is less than the longitudinal distance D2 between the bars of the pair of support bars 20, 21. FIGS. 1 to 3 show the application of structural element 1 to a central section 100 of agricultural equipment, while FIGS. 4 to 6 show the application of structural element 1 to a side section 100 of agricultural equipment. A person skilled in the art will understand that the side sections of agricultural equipment are customarily mirrored to each other, such that the representation of a single side section 110 is sufficient for a full understanding of the invention.

In this sense, FIG. 3 shows a section A-A of FIG. 2 where the relationship between the distances D1 and D2 of the pair of transverse beams 10, 11 and of the pair of support bars 20, 21, respectively, can be clearly observed. It is observed that this difference between distances D1 and D2 forms a substantially trapezoidal geometric lateral profile P between the transverse beams 10, 11 and support bars 20, 21, as seen in FIG. 6, such that two particular arrangements are configured: (i) a distance not only vertical, but also longitudinal and angular between the transverse beams 10, 11 and the support bars 20, 21 adjacent to each other; and (ii) the configuration of an open region 300 between the beams 10, 11 and bars 20, 21 for the free flow of the material flow cut by the disks 200 of the agricultural equipment.

Figure 9:
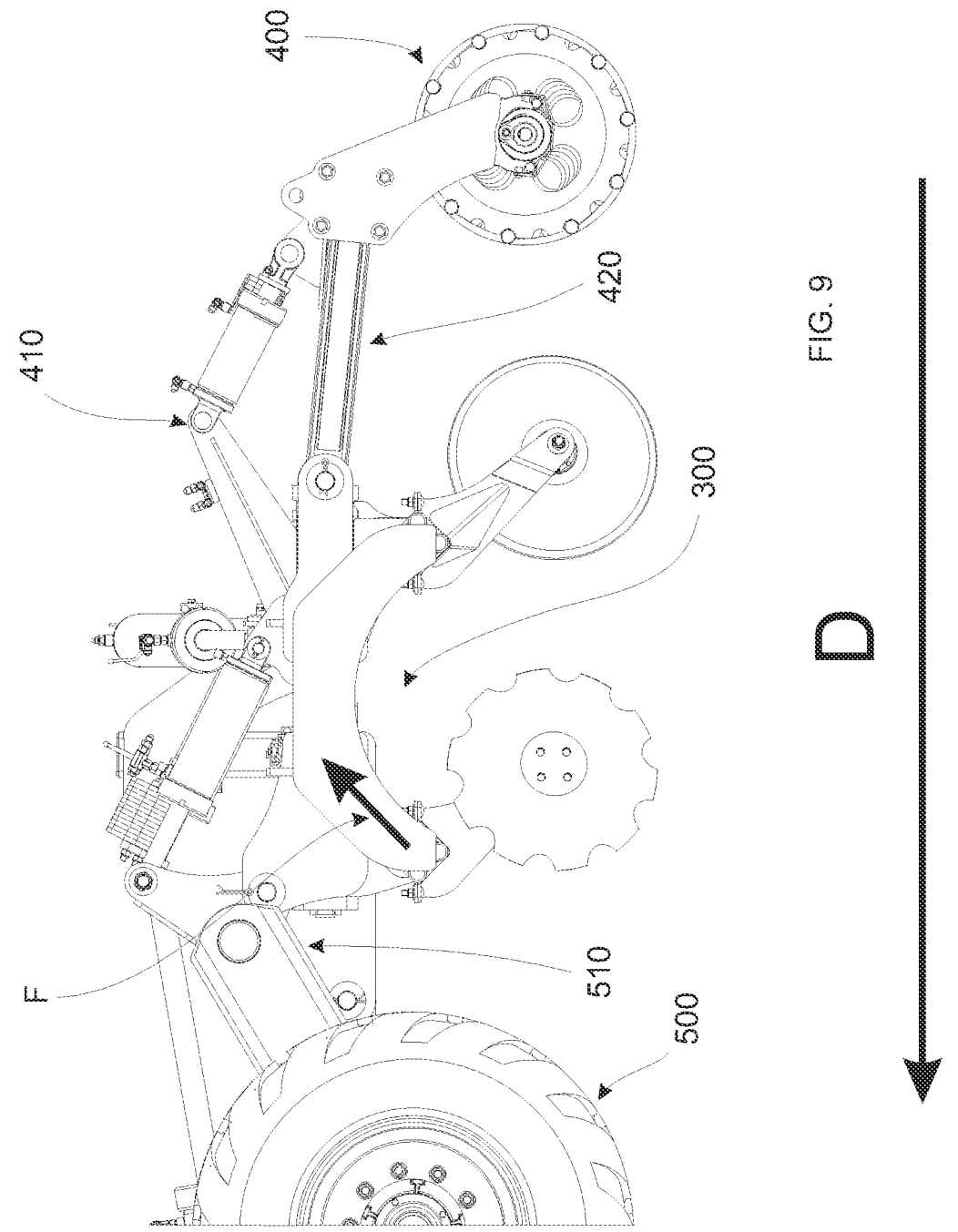
FIG. 9—is a side view of agricultural equipment containing the structural element of the present invention in a preferred embodiment.

The longitudinal and angular spacing between the transverse beams 10, 11 and support bars 20, 21 ensure that the efforts endured by the cutting disks 200 of the agricultural equipment are transferred between the support bars 20, 21 and the transverse beams 10, 11 in an angled direction in relation to the vertical axis, as seen in FIGS. 8 and 9, where the force transferred between beams 10, 11 and bars 20, 21 is represented by the arrow "F".

Different values/ratio between D1 and D2 can be used depending on the desired application and the efforts to be absorbed. As a preferred example of particular efficiency, there is a ratio between D2 and D1 (i.e., D2 divided by D1)

between 2.0 and 3.5, more preferably 2.7. Even more preferably, one has that D2=820 mm and D1=304 mm.

In this sense, it should be clarified that in prior art equipment structures, the absorption of the effort endured by the discs is mostly linear and perpendicular to the vertical axis, since the distances between the transverse beams and the supporting bars of the discs in the state of technique are substantially the same, thus resulting in a lateral profile for the arrangement of these elements that is "square" or "rectangular". This implies a transfer of forces to the support bars, which results mainly in a great bending effort of the support bar in relation to the transverse beam, which is not desirable.

The structural element 1 of the present invention, in turn, is capable of absorbing this effort in an angular manner, as seen in FIG. 8, and dividing the effort into flexion and compression components, thus improving the distribution and absorption of forces in the structural element 1.

Furthermore, this arrangement of the structural element 1 also allows the configuration of an open region 300 for the flow of materials cut by the set of discs 200. In the known state of the art, the intermediate region between the supporting beams and bars is quite small, as it is "square" or "rectangular", which implies constant obstructions and agglomerations of material in the various elements of the equipment. The structural element 1 of the present invention, in contrast, configures a substantially larger open region 300 in comparison, with side profile P in a substantially trapezoidal shape, which allows a more adequate flow of cut material, thus reducing the incidence of obstructions and material agglomeration.

In a possible embodiment, the association between at least one beam of the pair of transverse beams 10, 11 and at least one beam of the pair of support bars 20, 21 is configured through at least one support 30. As can be better seen in FIGS. 1 and 4, the support 30 preferably comprises a linear format to allow an adequate transfer of the efforts felt by the support bars 20, 21, to the transverse beams 10, 11, being the support angled in relation to the vertical axis to allow adequate angular transfer of effort. Strictly speaking, the support 30 is a component that absorbs part of the effort transmitted through its compression, as shown in FIG. 8.

In one possible embodiment, the structural element 1 comprises an arcuate profile plate 40 associated with the longitudinal end of the pair of transverse beams 10, 11 and the pair of support bars 20, 21. Said plate 40 also serves as a component of effort absorption, particularly those that act at the ends of beams 10, 11 and bars 20, 21, such that its arched profile helps in the proper absorption and decomposition of efforts.

As already clarified, in the preferred configuration disclosed herein, structural element 1 comprises a central section 100 hingedly associated with at least one side section 110, preferably a pair of side sections 110, each center section 100 and side section 110 each comprising at least one pair of crossbeams 10, 11 and at least one pair of support bars 20, 21. However, as already explained, the structural element 1 can be applied to agricultural equipment with a single rigid section, in which case a pair of transverse beams 10, 11 and a pair of support bars 20 are preferably used, 21.

It should also be noted that structural element 1 can be applied in such a way as to be associated with multiple additional components of agricultural equipment. In this preferred embodiment disclosed herein, the frame is associated, for example, with a crusher roller 400 through a combination of support and cylinder arrangements 410 and articulated beams 420 to allow articulation of the roller 400 with respect to the frame 1. Furthermore, structural element 1 may further be pivotally associated with one or more wheels 500 through support and cylinder arrangements 510 to allow articulation of structural element 1 with respect to wheels 500. These arrangements can be seen more clearly in FIG. 9, for example. It is further clarified that structural element 1 is particularly, but not imperative, applicable to agricultural equipment designed for traction by a tractor vehicle through a coupling engagement, for example.

Furthermore, the present invention also contemplates agricultural equipment provided with the structural element 1 described herein, in any of its possible embodiments.

Having described an example of preferred embodiment, it should be understood that the scope of the present invention encompasses other possible variations, being limited solely by the content of the appended claims, including possible equivalents therein.

The invention claimed is:

1. A structural element (1) for agricultural equipment, the structural element (1) comprising:

a pair of transverse beams (10, 11) connected with a pair of support bars (20, 21) of a set of agricultural discs (200), the longitudinal distance (D1) between the beams of the pair of transverse beams (10, 11) being less than the longitudinal distance (D2) between the bars of the pair of support bars (20, 21), at least one support (30) extending between and providing the connection of the pair of support bars (20, 21) and the pair of transverse beams (10, 11), the at least one support (30) being located at a position spaced apart from and other than both longitudinal ends of the pair of support bars (20, 21) and the pair of transverse beams (10, 11), respectively, and a plate (40) with an arcuate profile positioned at the longitudinal ends of both of the pair of transverse beams (10, 11) and the pair of support bars (20, 21) and providing a further connection of the pair of support bars (20, 21) and the pair of transverse beams (10, 11).

2. The structural element (1) according to claim 1, wherein the at least one support (30) is a linear support beam.

3. The structural element (1) according to claim 2, further comprising a central section (100) associated in an articulated manner with at least one lateral section (110), each central (100) and lateral section (110) comprising at least one pair of transverse beams (10, 11) and at least one pair of support bars (20, 21).

4. The structural element (1) according to claim 3, wherein the pair of transverse beams (10, 11) and the pair of support bars (20, 21) define an open region (300) in between for free flow of material flow coming from the set of discs (200).

5. The structural element (1) according to claim 4, wherein the open region (300) comprises a profile (P) of trapezoidal shape.

6. Agricultural equipment comprising the structural element (1) of claim 1.

* * * * *